(12) United States Patent
Lv et al.

(10) Patent No.: US 12,498,029 B2
(45) Date of Patent: Dec. 16, 2025

(54) MINIATURIZED ACTUATOR WITH SIMPLE STRUCTURE

(71) Applicant: Suzhou Luxshare Technology Co., Ltd., Suzhou (CN)

(72) Inventors: Kangning Lv, Suzhou (CN); Hui Cao, Suzhou (CN); Zhengguo Zhou, Suzhou (CN); Chengyu Xu, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 389 days.

(21) Appl. No.: 18/221,541

(22) Filed: Jul. 13, 2023

(65) Prior Publication Data
US 2024/0240701 A1   Jul. 18, 2024

(30) Foreign Application Priority Data

Jan. 13, 2023   (CN) .......................... 202310065031.4

(51) Int. Cl.
*H04B 1/03* (2006.01)
*F16H 37/06* (2006.01)
*H01Q 3/32* (2006.01)
*H04B 1/04* (2006.01)

(52) U.S. Cl.
CPC ............. *F16H 37/065* (2013.01); *H01Q 3/32* (2013.01)

(58) Field of Classification Search
CPC ........ F16H 37/065; H01Q 3/32; H01Q 1/246; H01Q 3/2658; H01Q 3/2676; H01Q 3/36; H04B 1/03; H04B 1/04; H04B 1/08; H04B 1/16; H04B 1/40; H04M 1/02; H04M 1/03; H04M 9/087
See application file for complete search history.

(56) References Cited

U.S. PATENT DOCUMENTS

2013/0307728 A1* 11/2013 Berger .................. H01Q 1/246
  342/374
2016/0352011 A1* 12/2016 Duan ....................... H01Q 3/32
2018/0161818 A1*  6/2018 Kwak ..................... B06B 1/166
(Continued)

FOREIGN PATENT DOCUMENTS

CN         104785530 A     7/2015
CN         105720370 A     6/2016
(Continued)

*Primary Examiner* — Andrew Wendell
(74) *Attorney, Agent, or Firm* — Birch, Stewart, Kolasch & Birch, LLP

(57) ABSTRACT

An actuator includes a drive mechanism, a shift mechanism, a screw rod mechanism and a base. The drive mechanism includes a first output shaft and a second output shaft. The shift mechanism includes a gear bracket and a first transmission gear. The first transmission gear has a rotation center extending in a first direction. The screw rod mechanism includes a number of screw assemblies, and each screw assembly includes a push rod. The second output shaft is configured to be able to drive the gear bracket to move along a second direction, so that the first transmission gear is able to mate with different screw rod assemblies. The first output shaft is configured to be able to drive the first transmission gear to rotate around its own rotation center, and then drive the screw assembly to move, so as to move the push rod.

20 Claims, 17 Drawing Sheets

(56) References Cited

U.S. PATENT DOCUMENTS

| | | | | |
|---|---|---|---|---|
| 2019/0124187 A1* | 4/2019 | Zeng | ............... | H04M 1/0254 |
| 2019/0331220 A1* | 10/2019 | Fu | ...................... | H01P 1/18 |
| 2020/0212565 A1* | 7/2020 | Li | ...................... | F16H 1/20 |
| 2021/0399394 A1* | 12/2021 | Ai | ................... | H01R 13/193 |
| 2021/0408679 A1* | 12/2021 | Wang | ............... | H01Q 3/005 |
| 2022/0224007 A1* | 7/2022 | Duan | ................ | H01Q 1/246 |
| 2022/0231413 A1* | 7/2022 | Everest | ............ | F16H 19/04 |
| 2022/0336940 A1 | 10/2022 | Liu et al. | | |
| 2023/0352830 A1* | 11/2023 | He | ...................... | H01Q 3/32 |
| 2024/0204404 A1* | 6/2024 | Lee | .................. | H01P 1/184 |
| 2025/0219287 A1* | 7/2025 | He | ...................... | H01Q 3/32 |
| 2025/0253526 A1* | 8/2025 | Lin Chou | ............. | H01Q 3/32 |

FOREIGN PATENT DOCUMENTS

| | | |
|---|---|---|
| CN | 106252883 A | 12/2016 |
| CN | 105720370 B | 1/2019 |
| CN | 109755747 A | 5/2019 |
| CN | 114927857 A | 8/2022 |
| TW | M564832 U | 8/2018 |
| TW | M599036 U | 7/2020 |

* cited by examiner

MINIATURIZED ACTUATOR WITH SIMPLE STRUCTURE

CROSS-REFERENCE TO RELATED APPLICATION

This patent application claims priority of a Chinese Patent Application No. 202310065031.4, filed on Jan. 13, 2023 and titled "ACTUATOR", the entire content of which is incorporated herein by reference.

TECHNICAL FIELD

The present disclosure relates to an actuator configured for a multi-channel phase shifter, which belongs to a field of base station antennas.

BACKGROUND

With the development of antenna technology, base station antennas are constantly expanding frequency bands and ports. At the same time, for accurate coverage and lower laying costs, electronically adjustable antennas are widely used. The electronically adjustable antenna can change the phase of the core component phase shifter (change the oscillator path) by remotely controlling the actuator, adjust the radiation beam inclination, and then realize the change of the antenna radiation coverage area. Multi-band and multi-port electronically tunable antennas are gaining more and more favor due to their relatively low laying costs. To achieve independent adjustment of radiation surfaces in different frequency bands, more independent transmission mechanisms need to be included in the actuator, which makes the structure of the actuator very complicated and occupies a lot of space.

SUMMARY

An object of the present disclosure is to provide an actuator with a relatively simple structure and occupies less space.

In order to achieve the above object, the present disclosure adopts the following technical solution: an actuator, configured for a multi-channel phase shifter, including: a drive mechanism including a first output shaft and a second output shaft; a shift mechanism including a gear bracket and a first transmission gear, the first transmission gear being rotatably supported by the gear bracket, the first transmission gear having a rotation center extending along a first direction; a screw rod mechanism including a plurality of screw rod assemblies, each screw rod assembly including a push rod; and a base; wherein the drive mechanism, the shift mechanism and the screw rod mechanism are all installed on the base; wherein the second output shaft is configured to be able to drive the gear bracket to move along a second direction, so that the first transmission gear is in a position where the first transmission gear is in transmission cooperation with different screw rod assemblies; and wherein the first output shaft is configured to be able to drive the first transmission gear to rotate around its own rotation center, thereby driving the screw rod assembly in transmission cooperation with the first transmission gear to move, so as to drive the push rod to move.

In order to achieve the above object, the present disclosure adopts the following technical solution: an actuator, including: a drive mechanism including a first output shaft and a second output shaft; a shift mechanism including a gear bracket and a first transmission gear, the first transmission gear being rotatably supported by the gear bracket, the first transmission gear having a rotation center extending along a first direction; a screw rod mechanism including a plurality of screw rod assemblies, each screw rod assembly including a push rod; and a base; wherein the drive mechanism, the shift mechanism and the screw rod mechanism are all installed on the base; wherein the second output shaft is configured to be able to drive the gear bracket to move along a second direction perpendicular to the first direction, so that the first transmission gear is able to be in transmission cooperation with different screw rod assemblies; and wherein the first output shaft is configured to be able to drive the first transmission gear to rotate, thereby driving a corresponding screw rod assembly in transmission cooperation with the first transmission gear to move, so as to drive the push rod to move.

Compared with related technologies, the present disclosure has the following advantages:
the overall structure of the actuator is relatively simple, occupies less space, and is easy to miniaturize a base station antenna.

DETAILED DESCRIPTION

Figure 1:
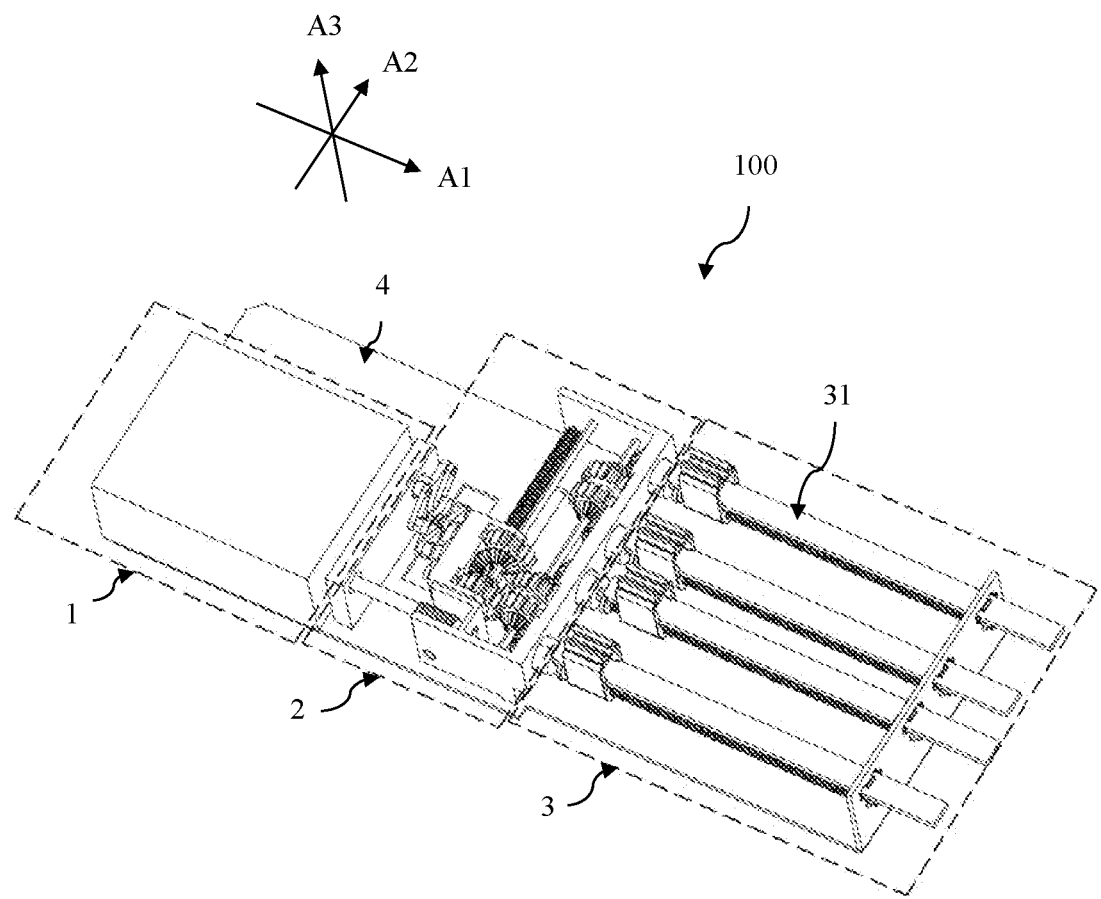
FIG. 1 is a schematic view of an overall structure of an actuator in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

In the drawings, a direction A1 is a first direction. A positive direction pointed by an arrow of the direction A1 is a front direction, and vice versa, a negative direction of the arrow of the direction A1 is a rear direction. A direction A2 is a second direction. A positive direction pointed by an arrow of the direction A2 is a right direction, and vice versa, a negative direction of the arrow of the direction A2 is a left direction. A position direction pointed by an arrow a direction A3 is a bottom-to-top direction, and vice versa, a negative direction of the arrow of the direction A3 is a top-to-bottom direction.

The present disclosure discloses an actuator 100, and the specific embodiment of the actuator 100 will be described in detail below with reference to the accompanying drawings.

The actuator 100 includes a drive mechanism 1, a shift mechanism 2, a screw rod mechanism 3 and a base 4. In one embodiment, the drive mechanism 1, the shift mechanism 2 and the screw rod mechanism 3 are all mounted on the base 4.

Figure 3:
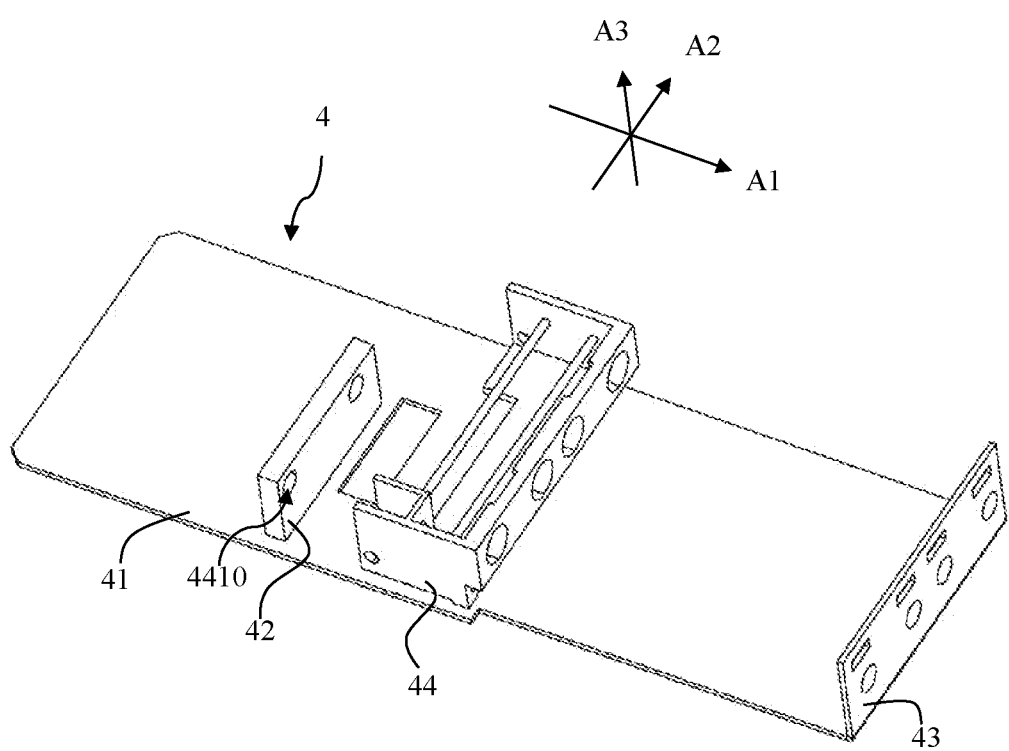
FIG. 3 is a schematic structural view of a base of the actuator in accordance with an embodiment of the present disclosure.
Figure 4:
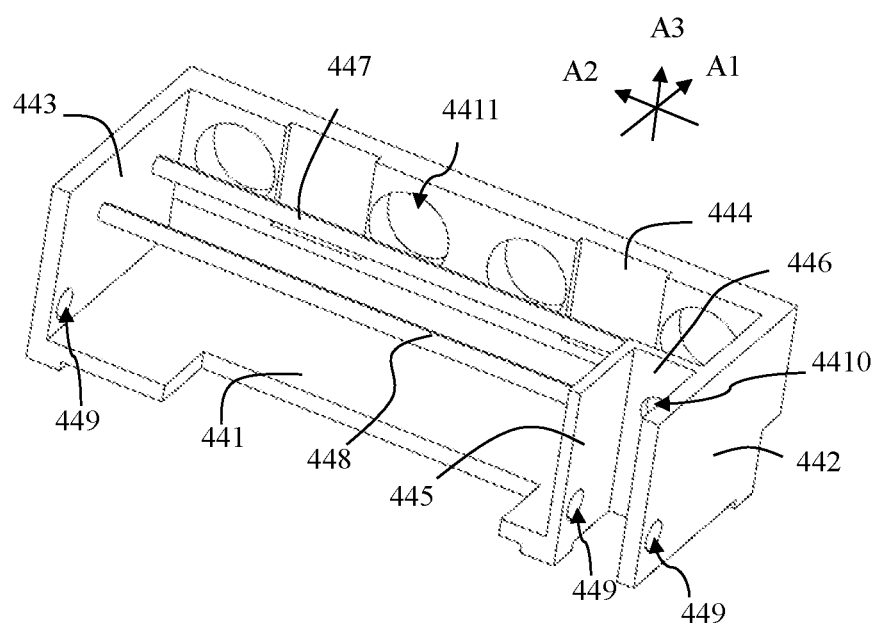
FIG. 4 is a structural schematic view of an angle of a bracket in an embodiment of the actuator of the present disclosure.
Figure 5:
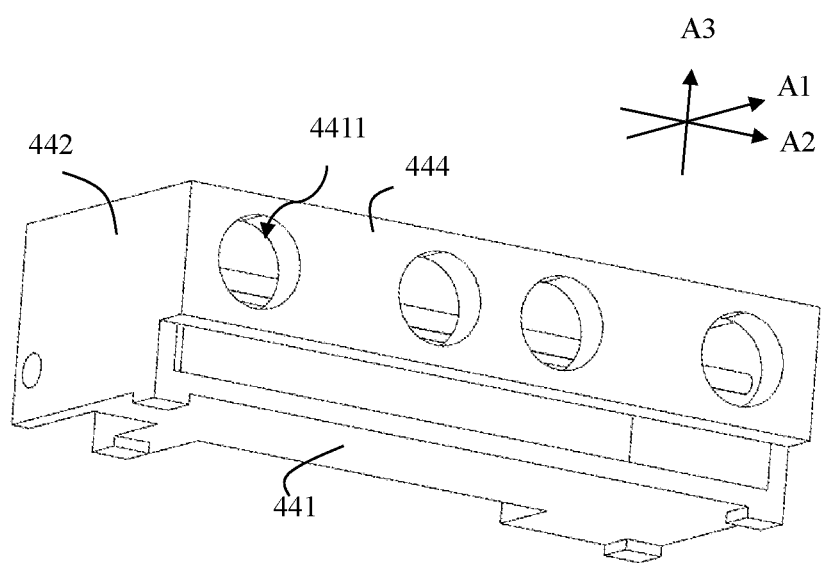
FIG. 5 is a structural schematic view of another angle of the bracket in an embodiment of the actuator of the present disclosure.

Referring mainly to FIGS. 3 to 5, the base 4 includes a base plate 41, a first support plate 42, a second support plate 43 and a bracket 44. Viewed along the first direction A1, the first support plate 42, the bracket 44 and the second support plate 43 are arranged at intervals. The first support plate 42, the bracket 44 and the second support plate 43 are all fixed on an upper side of the base plate 41. In the illustrated embodiment, the second support plate 43 located at a front end of the base plate 41 is integrally bent and formed with the base plate 41.

The bracket 44 includes a bottom plate 441, a first side plate 442, a second side plate 443, a third side plate 444, a fourth side plate 445, a fifth side plate 446, a first rod 447 and a second rod 448.

The bottom plate 441 is fixed to the upper side of the base plate 41. The first side plate 442 and the second side plate 443 are oppositely fixed on left and right sides of the bottom plate 441, respectively, along the second direction A2. The third side plate 444 extends between the first side plate 442 and the second side plate 443, and connects the first side plate 442 and the second side plate 443. The fourth side plate 445 is located between the first side plate 442 and the second side plate 443. The first side plate 442, the second side plate 443 and the fourth side plate 445 are parallel. The fifth side plate 446 is parallel to the third side plate 444, and the fifth side plate 446 connects the first side plate 442 and the fourth side plate 445. The first rod 447 has a central axis extending along the second direction A2. Two ends of the first rod 447 are fixedly connected to the first side plate 442 and the second side plate 443, respectively. The second rod 448 also has a central axis extending along the second direction A2. Two ends of the second rod 448 are fixedly connected to the second side plate 443 and the fourth side plate 445, respectively.

A seventh installation hole 449 is correspondingly defined on the first side plate 442, the second side plate 443 and the fourth side plate 445. The seventh installation hole 449 extends through the first side plate 442, the second side plate 443 and the fourth side plate 445 along the second direction A2.

An eighth installation hole 4410 is correspondingly defined on the first support plate 42 and the fifth side plate 446. The eighth installation hole 4410 extends through the first support plate 42 and the fifth side plate 446 along the first direction A1.

At least one ninth installation hole 4411 is defined on the third side plate 444. The ninth installation hole 4411 extends through the third side plate 444 along the first direction A1. In the illustrated embodiment, the third side plate 444 has four ninth installation holes 4411.

Figure 6:
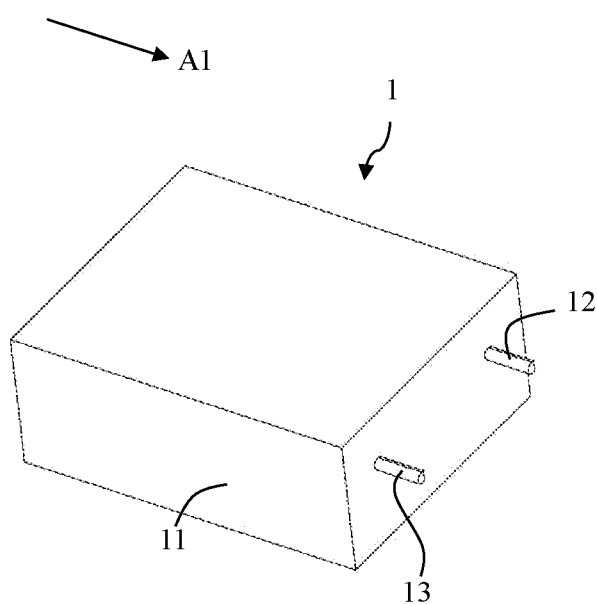
FIG. 6 is a structural schematic view of a drive mechanism of the actuator in accordance with an embodiment of the present disclosure.

Referring to FIG. 6, in the illustrated embodiment, the drive mechanism 1 includes two motors (not shown), and output shafts of the two motors are: a first output shaft 12 and a second output shaft 13. Both the first output shaft 12 and the second output shaft 13 extend out of an outer shell 11 of the drive mechanism 1. Both the first output shaft 12 and the second output shaft 13 extend along the first direction A1.

Referring mainly to FIGS. 7 to 17, the shift mechanism 2 includes a gear bracket 21, a first transmission gear 22, a first double-layer gear 23, a second double-layer gear 24, a second transmission gear 25 and a shaft coupling 26.

In the embodiment illustrated in the present disclosure, the shaft coupling 26 is a Schmidt shaft coupling. An input shaft of the shaft coupling 26 (hereinafter referred to as a second input shaft 261) is fixedly connected with the first output shaft 12. The second input shaft 261 is rotatably supported by the first support plate 42. The manner in which the second input shaft 261 is rotatably supported by the first support plate 42 includes but not limited to being rotatably supported by the first support plate 42 through a bearing.

An output shaft of the shaft coupling 26 (hereinafter referred to as a second output shaft 262) is fixedly connected to the first transmission gear 22, and therefore the second output shaft 262 can drive the first transmission gear 22 to rotate around the first direction A1.

The shaft coupling 26 further includes a first end disk 263, a middle disk 264, a second end disk 265 and a chain rod 266 connected between the aforementioned disks.

The second input shaft 261 is fixedly connected with the first end disk 263. The second end disk 265 is fixedly connected with the second output shaft 262.

The rotation of the first output shaft 12 drives the rotation of the second input shaft 261. The rotation of the second input shaft 261 drives the rotation of the first end disk 263. Two ends of the chain rod 266 are rotatably supported by the first end disk 263 and the middle plate 264, respectively. The rotation of the first end disk 263 is transmitted to the middle disk 264 through the chain rod 266. Similarly, the rotation of the middle disk 264 is transmitted to the second end disk 265 through the chain rod 266 connected between the middle disk 264 and the second end disk 265, and then drives the second output shaft 262 to rotate.

The Schmidt shaft coupling is a shaft coupling that can be used to accurately transmit torque on a radially offset shaft. Within the allowable range, the misalignment of the input shaft and the output shaft can be changed at will. Its working principle is a known technology in the art, so it will not be described in detail.

In the illustrated embodiment, the Schmidt shaft coupling (that is, the shaft coupling 26) adopts an arrangement including the first end disk 263, the middle disk 264 and the second end disk 265. It should be understood that in other embodiments of the present disclosure, the shaft coupling 26 may also only include the first end disk 263 and the second end disk 265, and the two disks are connected by the chain rod 266. In addition, in other embodiments of the present disclosure, an eccentric shaft coupling of another structural form may also be used instead of the Schmidt shaft coupling, as long as the center of rotation can be moved.

Figure 11:
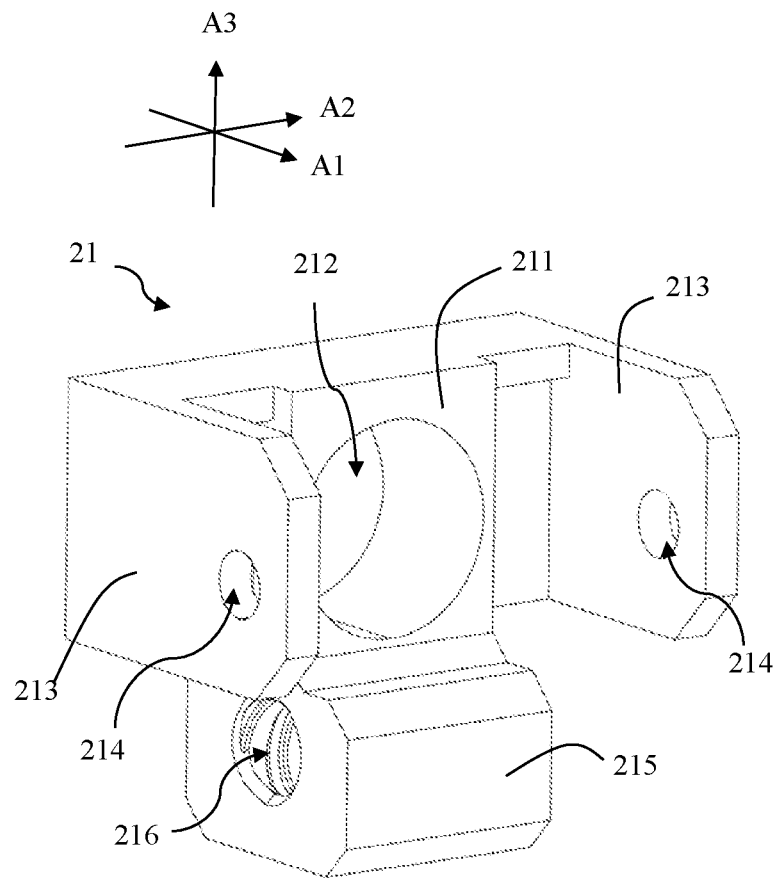
FIG. 11 is a schematic structural view of the gear bracket in an embodiment of the actuator of the present disclosure.

Referring to FIG. 11, the gear bracket 21 includes a bracket body 211, a first installation hole 212, an arm plate 213, a second installation hole 214, a tail portion 215 and a first threaded hole 216.

The first installation hole 212 extends through the bracket body 211 along the first direction A1. The first transmission gear 22 is rotatably supported by the first installation hole 212 through a bearing.

Figure 2:
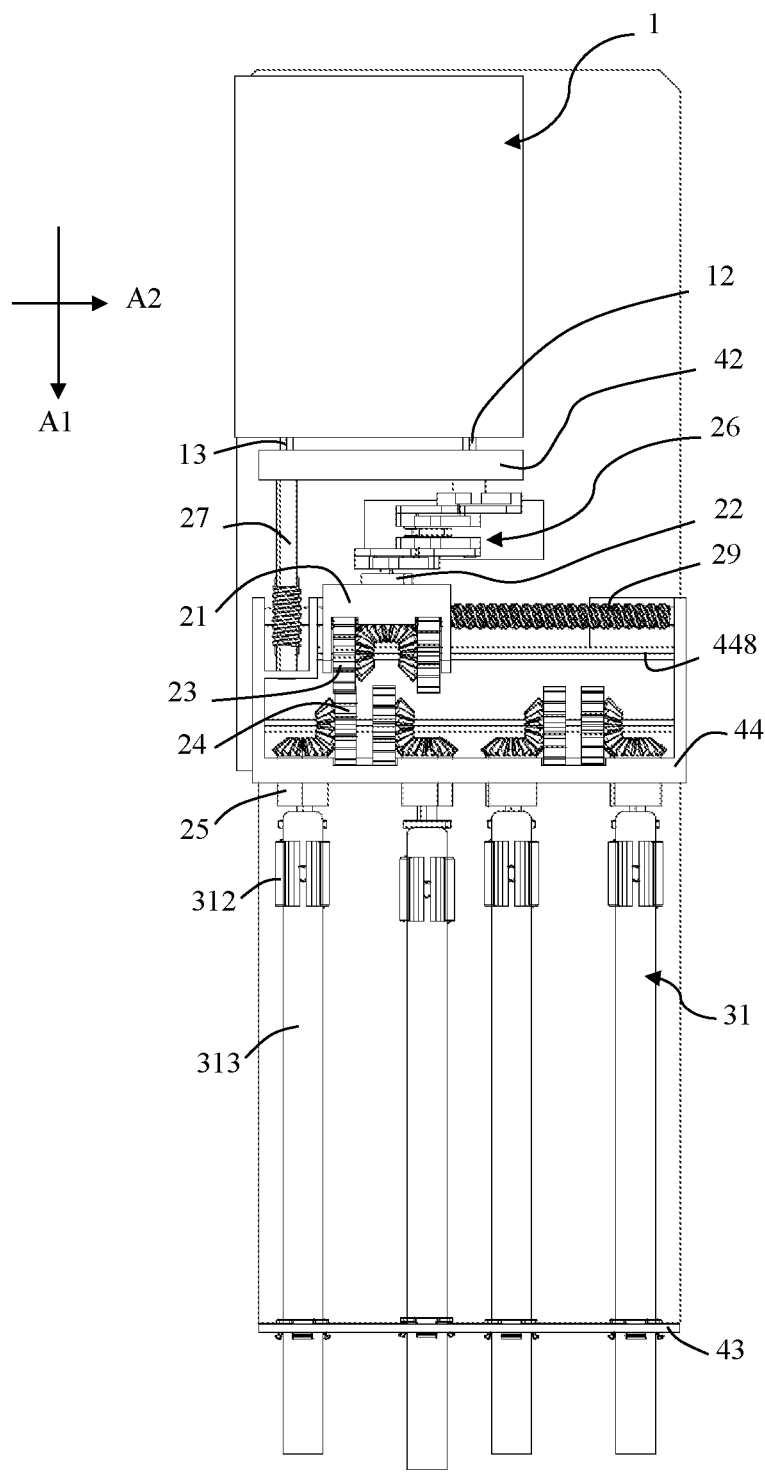
FIG. 2 is a schematic top view of the actuator in accordance with an embodiment of the present disclosure.

The two arm plates 213 respectively extend forward from left and right sides (sides pointed by the second direction A2) of the bracket body 211. The second installation hole 214 extends through the arm plate 213 along the second direction A2. The second rod 448 passes through the second installation hole 214, as shown in FIG. 2. The gear bracket 21 can move relative to the base 4 in the second direction A2. When the gear bracket 21 moves, the second rod 448 guides the gear bracket 21 and the first double-layer gear 23 which will be mentioned below.

Referring to FIG. 11, the tail portion 215 extends downward from a lower side of the bracket body 211. The first threaded hole 216 extends through the tail portion 215 along the second direction A2.

Figure 12:
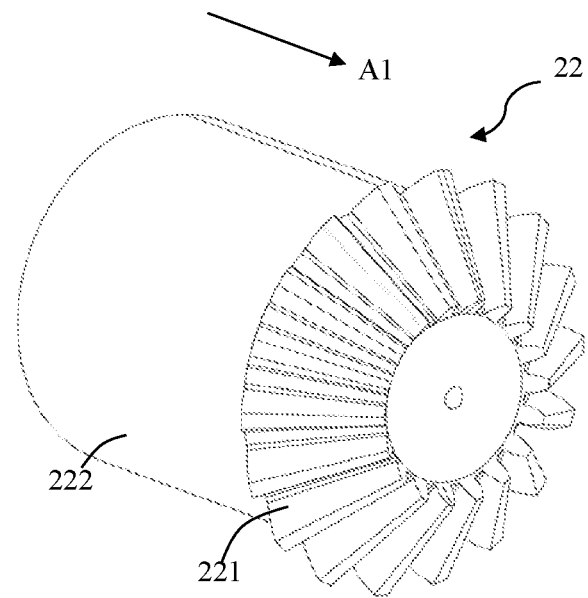
FIG. 12 is a structural schematic view of an angle of a first transmission gear in an embodiment of the actuator of the present disclosure.
Figure 13:
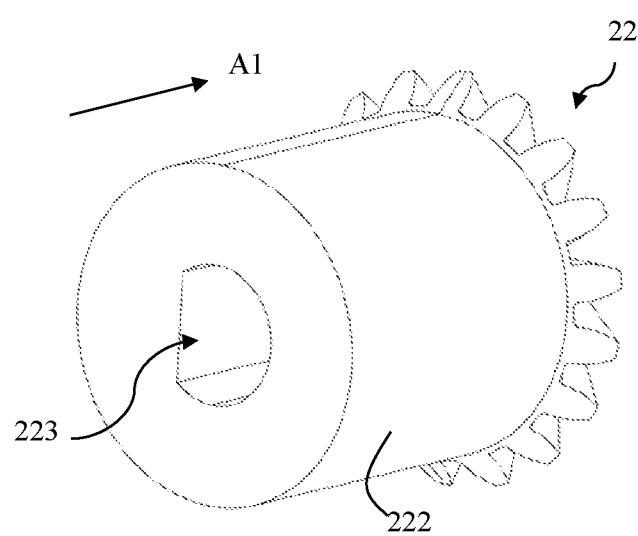
FIG. 13 is a structural schematic view of another angle of the first transmission gear in an embodiment of the actuator of the present disclosure.

Referring to FIG. 12 and FIG. 13, the first transmission gear 22 includes a first bevel gear portion 221 and a first installation portion 222. The first installation portion 222 is an axis extending along the first direction A1. The first bevel gear portion 221 is fixed on a front end (an end pointed by the arrow of the first direction A1) of the first installation portion 222.

The first transmission gear 22 further includes a third installation hole 223. The third installation hole 223 extends inside the first installation portion 222. An axis of the third installation hole 223 is collinear with an axis of the first installation portion 222. Besides, the third installation hole 223 extends through a rear end surface of the first installation portion 222.

A portion of the second output shaft 262 extends and is fixed in the third installation hole 223. The first installation portion 222 is rotatably supported by the first installation hole 212 through a bearing.

Figure 14:
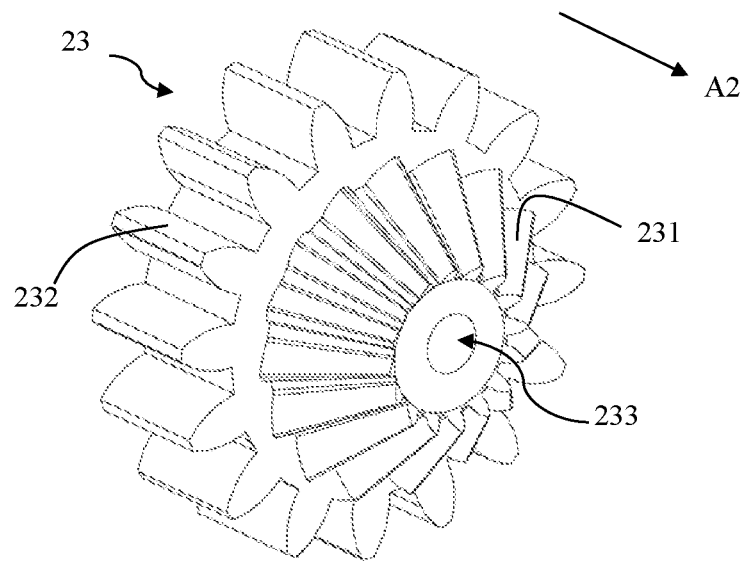
FIG. 14 is a schematic structural view of a first double-layer gear in an embodiment of the actuator of the present disclosure.
Figure 15:
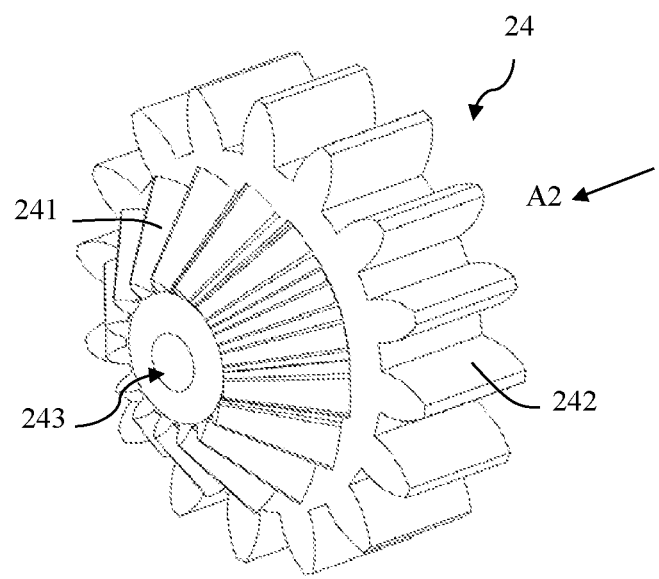
FIG. 15 is a schematic structural view of a second double-layer gear in an embodiment of the actuator of the present disclosure.

Referring to FIG. 14, the first double-layer gear 23 includes a second bevel gear portion 231, a first spur gear portion 232 and a fourth installation hole 233. The second bevel gear portion 231 is fixedly connected with the first spur gear portion 232. The rotation center of the second bevel gear portion 231 is in line with the rotation center of the first spur gear portion 232, and both the rotation centers extend along the second direction A2. The fourth installation hole 233 extends through the first double-layer gear 23 along the second direction A2.

Figure 9:
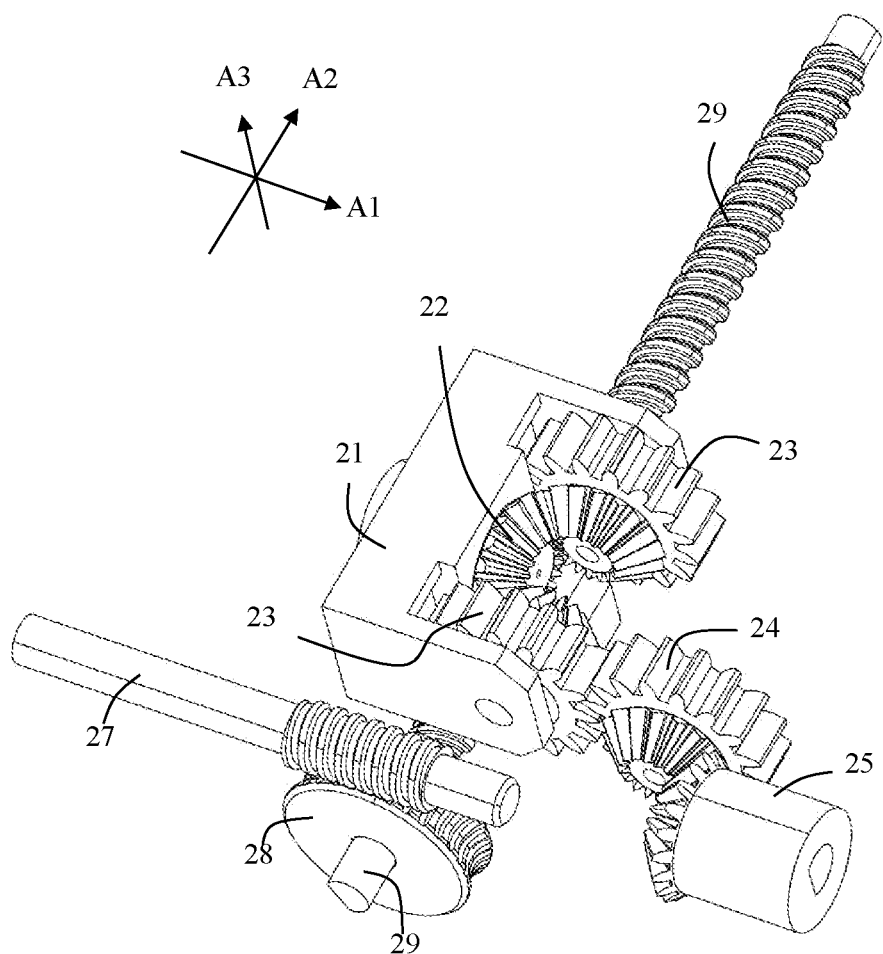
FIG. 9 is a schematic structural view of a part of the shift mechanism in an embodiment of the actuator of the present disclosure.
Figure 10:
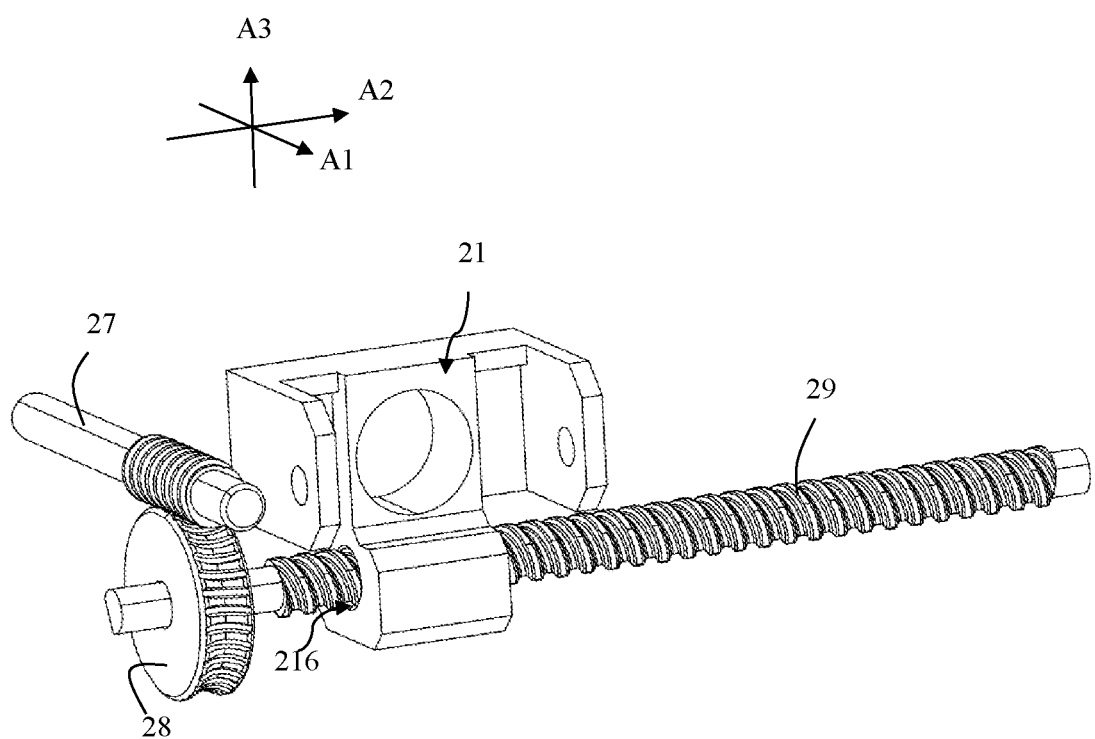
FIG. 10 is a structural schematic view of another part of the shift mechanism in an embodiment of the actuator of the present disclosure.

In the illustrated embodiment, the shift mechanism 2 has two first double-layered gears 23, as shown in FIG. 9. The second bevel gear portions 231 of the two first double-layer gears 23 are both meshed with the first bevel gear portion 221 of the first transmission gear 22. The two first double-layer gears 23 are supported on the second rod 448, which can both rotate relative to the second rod 448 and move along the second rod 448, as shown in FIG. 2. Specifically, for example: the two first double-layer gears 23 are both sleeved on an outer periphery of the second rod 448.

Driven by the first transmission gear 22, the two first double-layer gears 23 can rotate around their own rotation centers.

The structure of the second double-layer gear 24 is similar to that of the first double-layer gear 23. Referring to FIG. 15, and FIGS. 7 to 9, the second double-layer gear 24 includes a third bevel gear portion 241, a second spur gear portion 242 and a fifth installation hole 243. The third bevel gear portion 241 is fixedly connected with the second spur gear portion 242. The rotation center of the third bevel gear portion 241 is in line with the rotation center of the second spur gear portion 242, and extends along the second direction A2. The fifth installation hole 243 extends through the rotation center of the second double-layer gear 24 along the second direction A2.

In the illustrated embodiment, the shift mechanism 2 includes four second double-layer gears 24. The first rod 447 passes through the fifth installation holes 243 on the four second double-layer gears 24 in sequence. The four second double-layer gears 24 are all supported on the first rod 447 in such a way that they can rotate relative to the first rod 447 but cannot move along the first rod 447.

In other embodiments of the present disclosure, two ends of the first rod 447 can also be rotatably supported by the first side plate 442 and the second side plate 443, respectively. In this case, the four second double-layer gears 24 are all fixedly supported by the first rod 447.

When the gear bracket 21 moves along the second direction A2, the first double-layer gear 23 can mesh with different second double-layer gears 24, and then transmit power to the different second double-layer gears 24.

In the illustrated embodiment, the first double-layer gear 23 on the left is responsible for transmitting power to the two second double-layer gears 24 on the left. It should be understood that at the same time, the first double-layer gear 23 on the left can only transmit power to a certain second double-layer gear 24 on the left.

The first double-layer gear 23 on the right is responsible for transmitting power to the two second double-layer gears 24 on the right. It should be understood that at the same time, the first double-layer gear 23 on the right can only transmit power to a certain second double-layer gear 24 on the right.

When transmitting power, the first spur gear portion 232 of the first double-layer gear 23 meshes with the second spur gear portion 242 of the second double-layer gear 24.

Corresponding to the number of the second double-layer gears 24, in the illustrated embodiment, four second transmission gears 25 are provided.

The structure of the second transmission gear 25 is similar to that of the first transmission gear 22.

Figure 16:
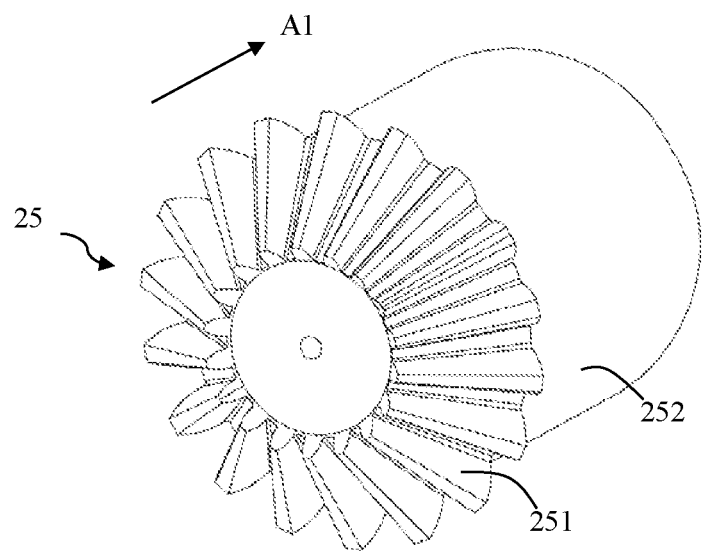
FIG. 16 is a structural schematic view of an angle of the second transmission gear in an embodiment of the actuator of the present disclosure.
Figure 17:
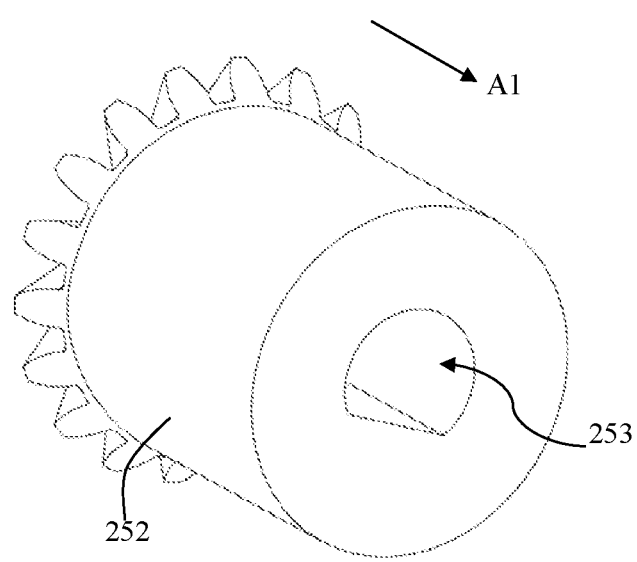
FIG. 17 is a structural schematic view of another angle of the second transmission gear in an embodiment of the actuator of the present disclosure.

Referring to FIGS. 16 and 17, the second transmission gear 25 includes a fourth bevel gear portion 251 and a second installation portion 252. The second installation portion 252 is an axis extending along the first direction A1. The fourth bevel gear portion 251 is fixed on a rear end of the second installation portion 252.

The second transmission gear 25 further includes a sixth installation hole 253. The sixth installation hole 253 extends inside the second installation portion 252. An axis of the sixth installation hole 253 is collinear with an axis of the second installation portion 252. Besides, the second installation hole 253 extends through a front end surface of the second installation portion 252.

Figure 7:
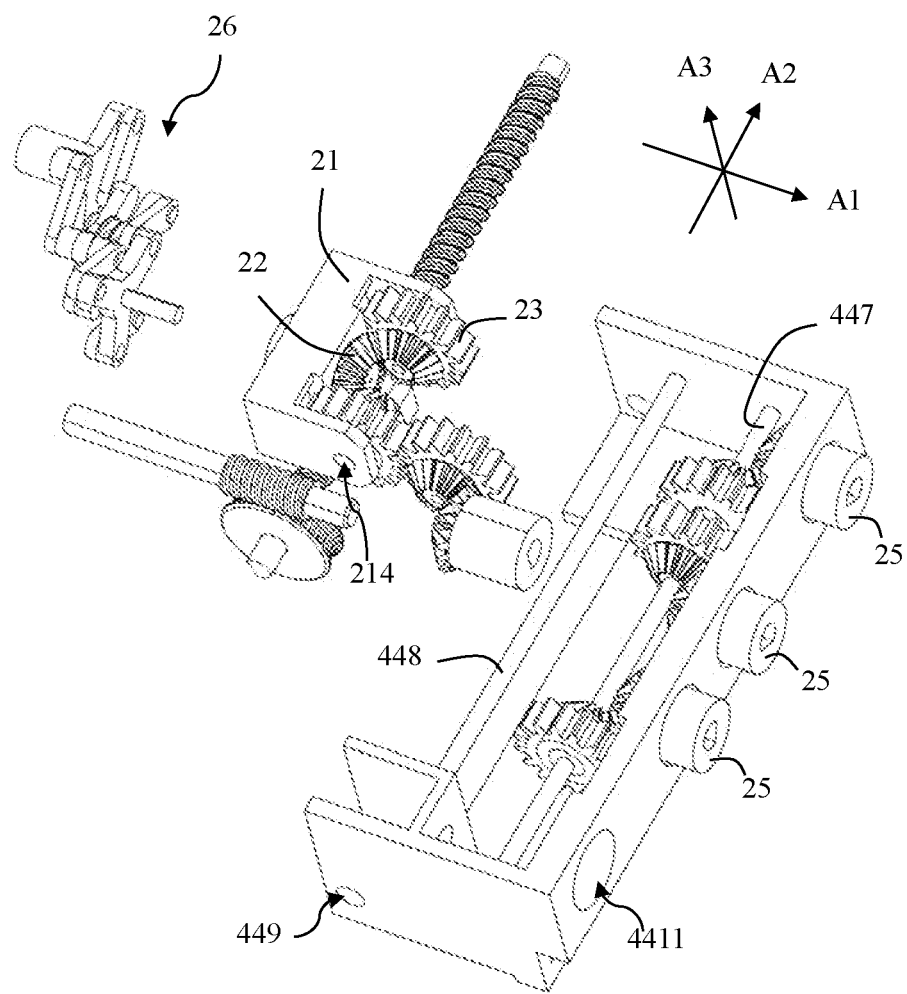
FIG. 7 is an exploded view of an angle of a shift mechanism in an embodiment of the actuator of the present disclosure.
Figure 8:
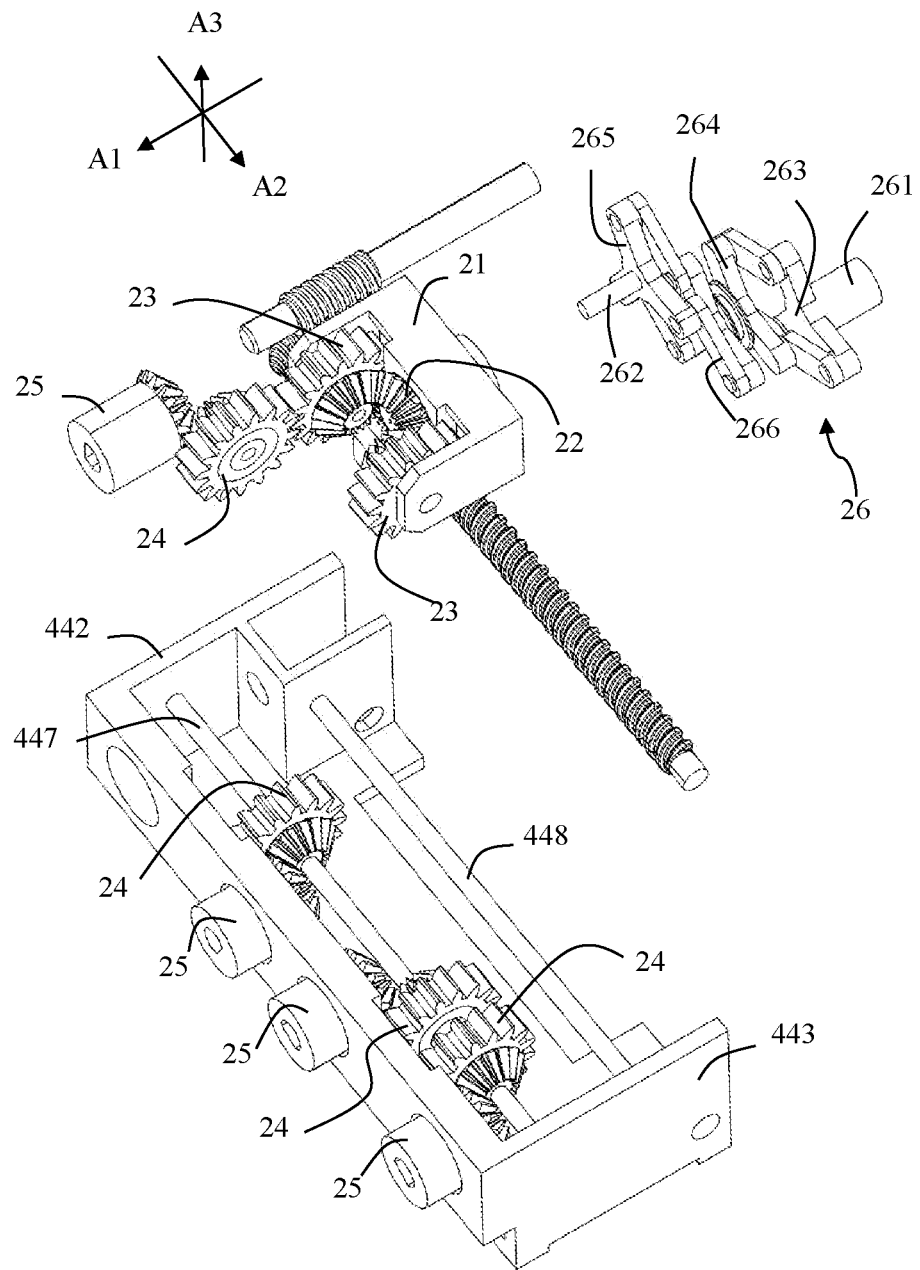
FIG. 8 is an exploded view of another angle of the shift mechanism in an embodiment of the actuator of the present disclosure.

The second installation portion 252 is rotatably supported in the ninth installation hole 4411 through a bearing, as shown in FIG. 7.

Each second double-layer gear 24 is matched with one second transmission gear 25. The third bevel gear portion 241 of each second double-layer gear 24 meshes with the fourth bevel gear portion 251 of the second transmission gear 25.

Driven by the second double-layer gear 24, the second transmission gear 25 rotates around its own rotation center. The rotation center of the second transmission gear 25 is in line with the axis of the second installation portion 252.

Referring mainly to FIG. 9, FIG. 10, FIG. 4, FIG. 5 and FIG. 2, the shift mechanism 2 further includes a worm rod 27, a worm wheel 28 and a shift screw rod 29. The worm rod 27 has a rotation center extending along the first direction A1. One end of the worm rod 27 is rotatably supported by the eighth installation hole 4410 on the first support plate 42, and another end is rotatably supported by the eighth installation hole 4410 on the fifth side plate 446. One end of the worm rod 27 is fixedly connected with the second output shaft 13, and another end of the worm rod 27 is meshed with the worm wheel 28. The worm wheel 28 is fixed on the left end of the shift screw rod 29.

The left end of the shift screw rod 29 is rotatably supported by the seventh installation hole 449 on the first side plate 442. The right end of the shift screw rod 29 is rotatably supported by the seventh installation hole 449 on the second side plate 443. The shift screw rod 29 passes through or is rotatably supported by the seventh installation hole 449 on the fourth side plate 445.

The shift screw rod 29 has a rotation center extending in the second direction A2. The shift screw rod 29 passes through the first threaded hole 216 and is threadedly engaged with the first threaded hole 216. When the second output shaft 13 rotates, the worm rod 27 rotates around the first direction A1, thereby driving the worm wheel 28 to rotate. The worm wheel 28 is in line with the rotation center of the shift screw rod 29. The worm gear 28 drives the shift screw rod 29 to rotate, and then drives the gear bracket 21 to move relative to the base 4 in the second direction A2, so that the first double-layer gear 23 can mesh with different second double-layer gears 24 for transmission.

Figure 18:
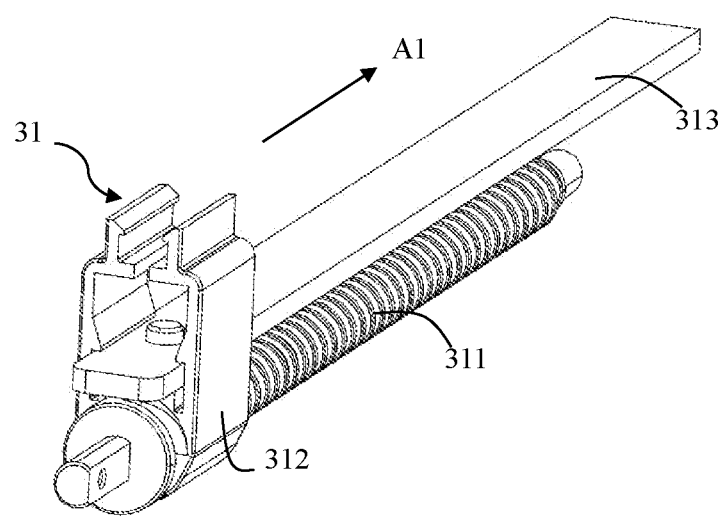
FIG. 18 is a schematic structural view of a screw rod assembly in an embodiment of the actuator of the present disclosure.
Figure 19:
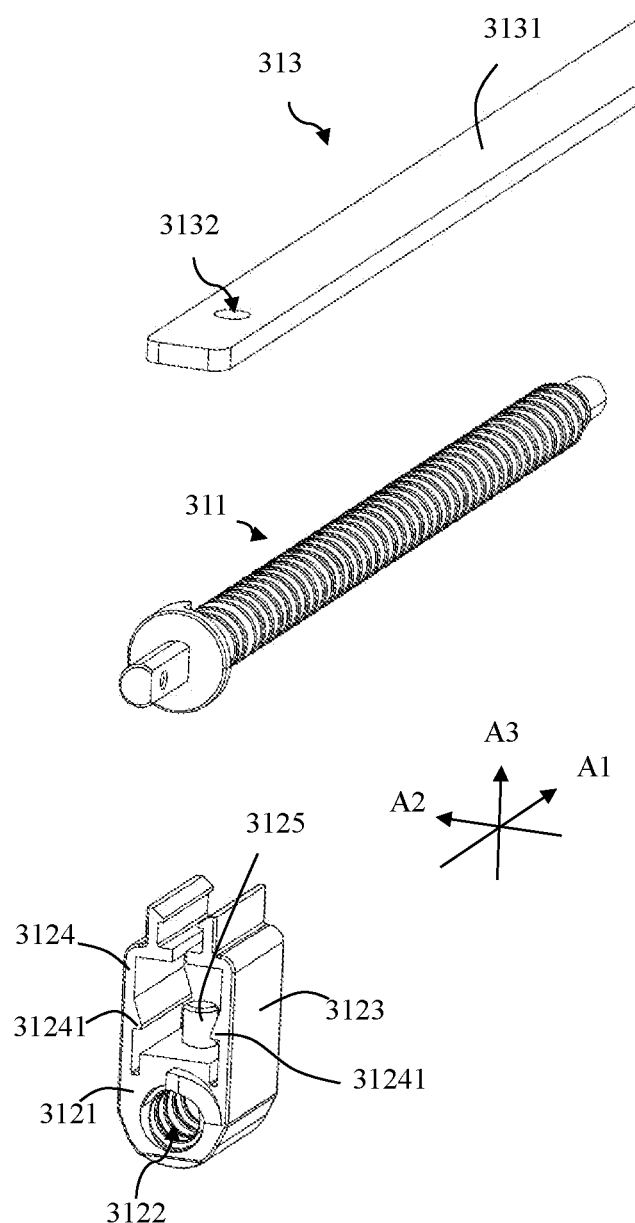
FIG. 19 is an exploded view of an angle of a screw rod assembly in an embodiment of the actuator of the present disclosure.
Figure 20:
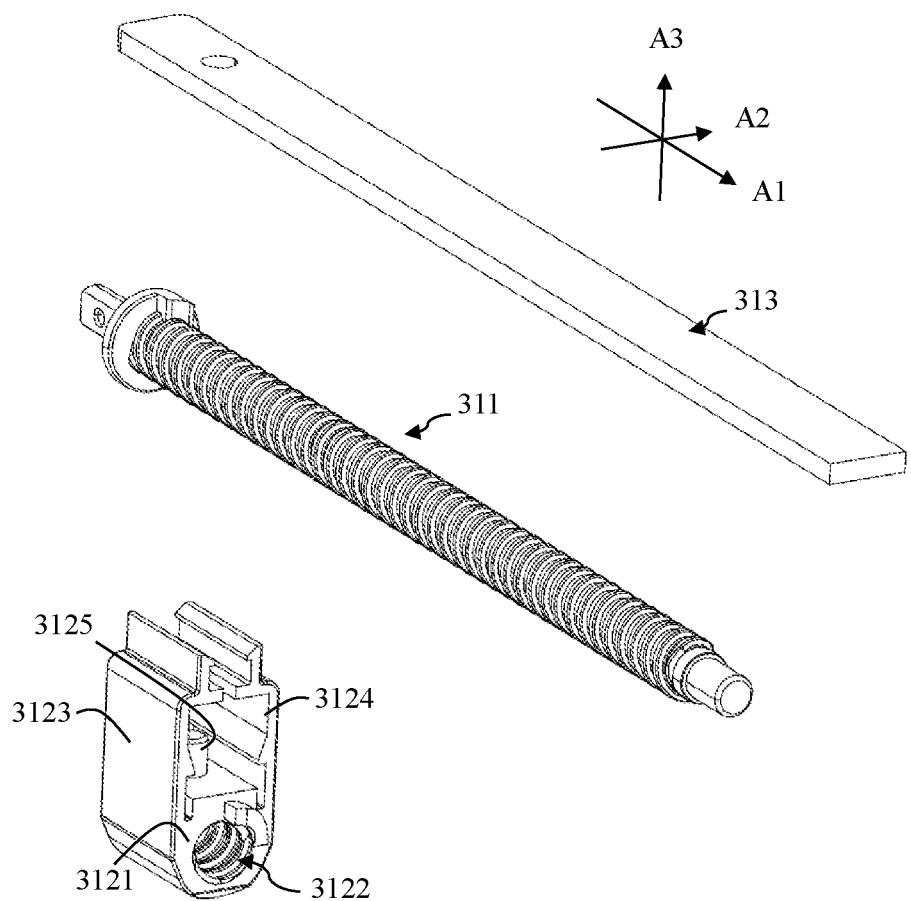
FIG. 20 is an exploded view of another angle of the screw rod assembly of an embodiment of the actuator of the present disclosure.

In the illustrated embodiment, the screw rod mechanism 3 includes four screw assemblies 31. Referring mainly to FIGS. 18 to 20, each screw assembly 31 includes a screw 311, a moving member 312 and a push rod 313.

The screw rod 311 has a rotation center extending along the first direction A1. A rear end of the threaded rod 311 is fixed to the sixth installation hole 253 of the second transmission gear 25. A front end of the threaded rod 311 is rotatably supported by the second support plate 43.

The moving member 312 includes a body portion 3121, a second threaded hole 3122, a first locking arm 3123, a second locking arm 3124 and a positioning post 3125.

The second threaded hole 3122 extends through the body portion 3121 along the first direction A1. The threaded rod 311 is screwed through the second threaded hole 3122. The screw rod 311 is threadedly engaged with the moving member 312.

The first locking arm 3123 and the second locking arm 3124 extend upward from left and right sides of the main body portion 3121, respectively. The first locking arm 3123 and the second locking arm 3124 are provided with protrusions 31241 facing each other. The positioning post 3125 is fixed on an upper surface of the body portion 3121.

The push rod 313 includes a rod body 3131 and a through hole 3132. The through hole 3132 extends through the rod body 3131 along a third direction (i.e., a vertical direction).

The push rod 313 is fitted or fixed on the positioning post 3125 through the through hole 3132. The upper surface of the body portion 3121, and the first locking arm 3123 and the second locking arm 3124 constrain the push rod 313 so that the push rod 313 moves along with the moving member 312. Meanwhile, the front end of the push rod 313 passes through the second support plate 43. The second support plate 43 constitutes a position limit for the push rod 313, thereby limiting the degree of freedom of the moving member 312 to rotate around the direction A1. Furthermore, when the screw rod 311 rotates, the moving member 312 cannot follow the rotation, but can only move relative to the base 4 along the rotation axis direction of the screw rod 311, thereby driving the push rod 313 to move along the direction A1. Furthermore, the movement of the push rod 313 drives the movement of the internal parts of the multi-channel phase shifter, thereby changing the phase of a certain channel in the multi-channel phase shifter.

In the aforementioned embodiments, the positioning post 3125 is located on the moving member 312, and the through hole 3132 is located on the push rod 313. In other embodiments of the present disclosure, the positioning post 3125 may be located on the push rod 313. Correspondingly, the through hole 3132 is located on the moving member 312. It should be understood that the through hole 3132 may also be replaced by a blind hole.

When the actuator 100 operates, mainly referring to FIG. 2, the second output shaft 13 first rotates, which drives the worm rod 27, the worm wheel 28 and the shift screw rod 29 to rotate. The rotation of the shift screw rod 29 drives the gear bracket 21 threadedly connected with it to move along the shift screw rod 29, and then a certain first double-layer gear 23 meshes with a certain second double-layer gear 24. The first output shaft 12 moves to drive the first transmission gear 22 to rotate through the shaft coupling 26. The use of the shaft coupling 26 enables the first transmission gear 22 to accurately transmit torque after the gear bracket 21 moves along the shift screw rod 29. The rotation of the first transmission gear 22 drives the rotation of the two first double-layer gears 23, and the first double-layer gear 23 meshing with the second double-layer gear 24 transmits power to the second double-layer gear 24. It should be understood that at the same time, only one first double-layer gear 23 and one second double-layer gear 24 are meshed. The driven second double-layer gear 24 drives the second transmission gear 25 meshed with it to rotate, thereby causing the screw rod 311 to rotate around its rotation center, and the moving member 312 drives the push rod 313 to move along the direction A1.

In the foregoing embodiments, two first double-layer gears 23 are provided, which makes the shift mechanism 2 of the actuator 100 more compact in structure. More screw rod assemblies 31 can be connected in the same space, and the structure is more stable, the moving distance of the gear bracket is shorter, and the miniaturization of the shaft coupling that is easy to adapt to it is easy.

In other embodiments of the present disclosure, only one first double-layer gear 23 may be provided, and the power is transmitted to different downstream screw assemblies 31 through the first double-layer gear 23.

In the foregoing embodiments, the two first double-layered gears 23 are both sleeved on the second rod 448, and then move accordingly when the gear bracket 21 moves along the second direction A2. In other embodiments of the present disclosure, the two first double-layer gears 23 can also be rotatably supported by the two arm plates 213 of the gear bracket 21; and the second rod 448 passes through the bracket body 211 to limit and guide the gear bracket 21.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An actuator, configured for a multi-channel phase shifter, comprising:
a drive mechanism comprising a first output shaft and a second output shaft;
a shift mechanism comprising a gear bracket and a first transmission gear, the first transmission gear being rotatably supported by the gear bracket, the first transmission gear having a rotation center extending along a first direction;
a screw rod mechanism comprising a plurality of screw rod assemblies, each screw rod assembly comprising a push rod; and
a base;
wherein the drive mechanism, the shift mechanism and the screw rod mechanism are all installed on the base;
wherein the second output shaft is configured to be able to drive the gear bracket to move along a second direction, so that the first transmission gear is in a position where the first transmission gear is in transmission cooperation with different screw rod assemblies; and
wherein the first output shaft is configured to be able to drive the first transmission gear to rotate around its own rotation center, thereby driving the screw rod assembly in transmission cooperation with the first transmission gear to move, so as to drive the push rod to move.

2. The actuator according to claim 1, wherein the shift mechanism further comprises a shaft coupling; one end of the shaft coupling is fixedly connected with the first output shaft, and another end of the shaft coupling is fixedly connected with the first transmission gear.

3. The actuator according to claim 1, wherein the shift mechanism further comprises a first double-layer gear and a second double-layer gear;
the first transmission gear comprises a first bevel gear portion;
the first double-layer gear comprises a second bevel gear portion and a first spur gear portion; the first bevel gear portion meshes with the second bevel gear portion; the first double-layer gear is configured to be able to move synchronously with the gear bracket along the second direction;
a plurality of second double-layer gears are provided; each of the second double-layer gears comprises a third bevel gear portion and a second spur gear portion; the first spur gear portion is capable of meshing with the second spur gear portion for transmission.

4. The actuator according to claim 3, wherein the shift mechanism further comprises a plurality of second transmission gears; each of the second double-layer gears is matched with a corresponding second transmission gear; each of the second transmission gears comprises a fourth bevel gear portion; the third bevel gear portion meshes with the fourth bevel gear portion.

5. The actuator according to claim 3, wherein two first double-layer gears are provided; and
wherein the two first double-layer gears are disposed on two sides of the first transmission gear, respectively, viewed along the first direction.

6. The actuator according to claim 5, wherein the base comprises a second rod which extends through the gear bracket along the second direction; the two first double-layer gears are both sleeved on an outer periphery of the second rod.

7. The actuator according to claim 5, wherein the plurality of second double-layer gears are divided into two groups; the first double-layer gears are configured such that one first double-layer gear is responsible for driving one group of second double-layer gears.

8. The actuator according to claim 5, wherein the gear bracket comprises a bracket body, a first installation hole and two arm plates;

the first installation hole extends through the bracket body along the first direction; the first transmission gear is rotatably supported in the first installation hole;

the two arm plates extend from two sides of the bracket body along the first direction; and the two first double-layer gears are located between the two arm plates.

9. The actuator according to claim 3, wherein the base comprises a first rod; the first rod extends along the second direction and extends through rotation centers of the plurality of second double-layer gears; and the plurality of the second double-layer gears are rotatably supported on the base.

10. The actuator according to claim 4, wherein each of the screw rod assemblies further comprises a screw rod and a moving member;

one end of the screw rod is fixedly connected to the second transmission gear, and another end of the screw rod is rotatably supported on the base;

the moving member is screwed to the screw rod and is movable relative to the screw rod along the first direction; and the push rod is configured to move synchronously with the moving member.

11. The actuator according to claim 1, wherein the shift mechanism further comprises a worm rod, a worm wheel and a shift screw rod rotatably supported on the base;

one end of the worm rod is fixedly connected with the second output shaft; the worm rod meshes with the worm wheel; the worm wheel is fixed to the shift screw rod; and the shift screw rod is threadedly connected with the gear bracket.

12. The actuator according to claim 11, wherein the gear bracket comprises a tail portion which has a first threaded hole extending along the second direction; the shift screw rod is screwed to the first threaded hole to drive the gear bracket to move in the second direction.

13. An actuator, comprising:

a drive mechanism comprising a first output shaft and a second output shaft;

a shift mechanism comprising a gear bracket and a first transmission gear, the first transmission gear being rotatably supported by the gear bracket, the first transmission gear having a rotation center extending along a first direction;

a screw rod mechanism comprising a plurality of screw rod assemblies, each screw rod assembly comprising a push rod; and a base;

wherein the drive mechanism, the shift mechanism and the screw rod mechanism are all installed on the base;

wherein the second output shaft is configured to be able to drive the gear bracket to move along a second direction perpendicular to the first direction, so that the first transmission gear is able to be in transmission cooperation with different screw rod assemblies; and wherein the first output shaft is configured to be able to drive the first transmission gear to rotate, thereby driving a corresponding screw rod assembly in transmission cooperation with the first transmission gear to move, so as to drive the push rod to move.

14. The actuator according to claim 13, wherein the shift mechanism further comprises a shaft coupling; one end of the shaft coupling is fixedly connected with the first output shaft, and another end of the shaft coupling is fixedly connected with the first transmission gear.

15. The actuator according to claim 13, wherein the shift mechanism further comprises a first double-layer gear and a second double-layer gear;

the first transmission gear comprises a first bevel gear portion;

the first double-layer gear comprises a second bevel gear portion and a first spur gear portion; the first bevel gear portion meshes with the second bevel gear portion; the first double-layer gear is configured to be able to move synchronously with the gear bracket along the second direction;

a plurality of second double-layer gears are provided; each of the second double-layer gears comprises a third bevel gear portion and a second spur gear portion; the first spur gear portion is capable of meshing with the second spur gear portion for transmission.

16. The actuator according to claim 15, wherein the shift mechanism further comprises a plurality of second transmission gears; each of the second double-layer gears is matched with a corresponding second transmission gear; each of the second transmission gears comprises a fourth bevel gear portion; the third bevel gear portion meshes with the fourth bevel gear portion.

17. The actuator according to claim 15, wherein two first double-layer gears are provided; and wherein the two first double-layer gears are disposed on two sides of the first transmission gear, respectively, viewed along the first direction.

18. The actuator according to claim 15, wherein the base comprises a first rod; the first rod extends along the second direction and extends through rotation centers of the plurality of second double-layer gears; and the plurality of the second double-layer gears are rotatably supported on the base.

19. The actuator according to claim 16, wherein each of the screw rod assemblies further comprises a screw rod and a moving member;

one end of the screw rod is fixedly connected to the second transmission gear, and another end of the screw rod is rotatably supported on the base;

the moving member is screwed to the screw rod and is movable relative to the screw rod along the first direction; and the push rod is configured to move synchronously with the moving member.

20. The actuator according to claim 13, wherein the shift mechanism further comprises a worm rod, a worm wheel and a shift screw rod rotatably supported on the base;

one end of the worm rod is fixedly connected with the second output shaft; the worm rod meshes with the worm wheel; the worm wheel is fixed to the shift screw rod; and the shift screw rod is threadedly connected with the gear bracket.

* * * * *